United States Patent

[11] 3,561,424

| [72] | Inventor | Anthony C. Failla<br>26360 S. Western Ave., Lomita, Calif. 90717 |
|---|---|---|
| [21] | Appl. No. | 866,783 |
| [22] | Filed | Sept. 15, 1969 |
| [45] | Patented | Feb. 9, 1971 |

[54] FOOD WARMING BY EXOTHERMIC REACTION
8 Claims, 7 Drawing Figs.

[52] U.S. Cl. .................................................. 126/263, 126/262
[51] Int. Cl. ...................................................... A47g 23/04, F24j 1/00
[50] Field of Search ......................................... 126/262, 263

[56] References Cited
UNITED STATES PATENTS

| 2,300,793 | 11/1942 | Martin | 126/263 |
| 2,582,865 | 1/1952 | Gourgues | 126/262 |
| 2,733,710 | 2/1956 | Zibell | 126/263 |
| 2,850,006 | 9/1958 | Karpalo | 126/263X |
| 2,916,886 | 12/1959 | Robbins | 126/263X |

FOREIGN PATENTS

| 285,511 | 9/1928 | Great Britain | 126/263 |

*Primary Examiner*—Charles J. Myhre
*Attorney*—Beehler & Arant

ABSTRACT: A food warmer for packaged food substances in which two sacks of ingredients are packaged in one chamber and the package of food is placed in an adjacent chamber. Prongs on the second container pierce both sacks so that water in one sack is released to moisten a dry material such as lime in the other sack to generate an exothermic reaction sufficient to create enough warm vapor to surround and heat the package.

INVENTOR.
ANTHONY C. FAILLA
BY Buehler & Cront
ATTORNEYS.

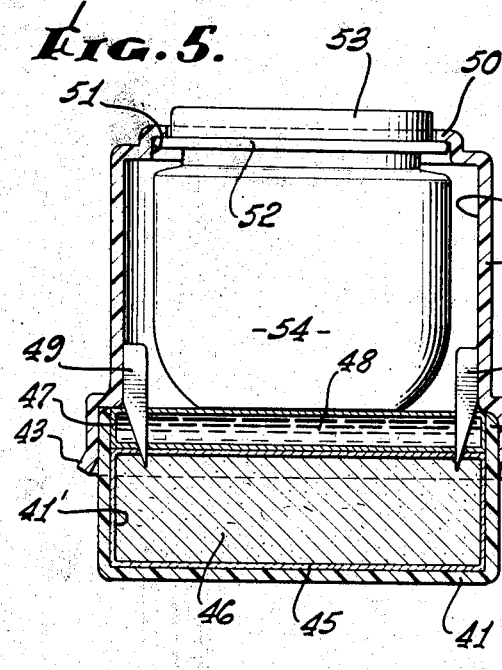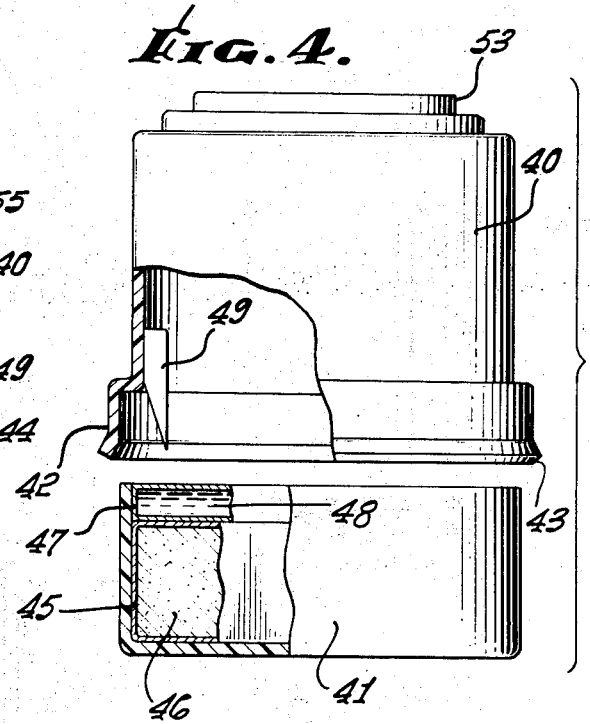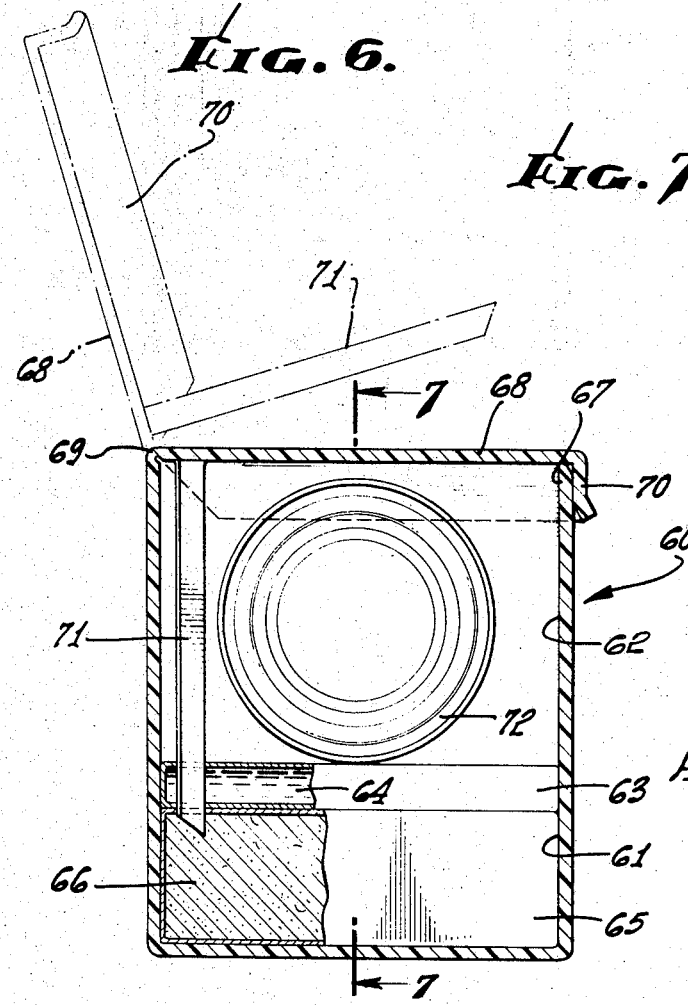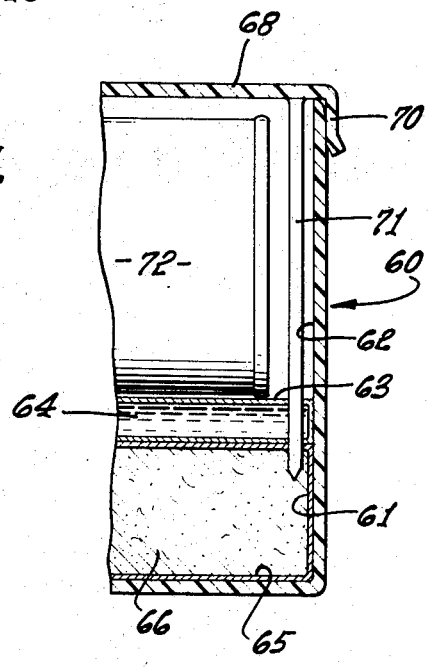

FOOD WARMING BY EXOTHERMIC REACTION

Although packaged warming devices of various kinds have heretofore been attempted for warming foods, some of which have undertaken to utilize the exothermic reaction created by bringing quick lime into contact with water, thereby to generate hot vapor for heating purposes, acceptable mechanical devices have not found acceptance on the market to any appreciable degree. It appears from prior patents suggesting this principle, such as patents 2,613,664 and 2,579,405, that containers for separately housing the ingredients prior to reaction are too complex to warrant wide spread acceptance and also fail to provide an easy, handy, acceptable means for automatically bringing the ingredients together in a condition for reaction after the container has been satisfactorily closed upon the package of food.

It is therefore among the objects of the invention to provide a new and improved food warmer of the exothermic type wherein the container for the exothermic material and the package of food to be warmed is simple, inexpensive, and easy to manipulate.

Another object of the invention is to provide a new and improved food warmer of the exothermic type of such construction that the materials for generating heat are kept safely apart until after the container has been effectively closed and wherein the act of closing separate parts of the container is made use of through an appropriate instrument for starting the heating reaction.

Still another object of the invention is to provide a new and improved food warmer which makes use of combining two chemicals to start an exothermic reaction wherein the container is so constructed that there is no physical contact between hot vapors generated by the reaction and the package which contains the food to be warmed.

Still further among the objects of the invention is to provide a particularly simple and inexpensive container for the warming of packaged foods of such construction that virtually the only operation needed to set the warming process in operation is that of dropping the food package into the container and closing the lid.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 4 is a side elevational view partially in section showing a second form of the device with parts of the container means still separated.

FIG. 5 is a longitudinal sectional view similar to FIG. 4, but showing the parts of the container means brought together for starting the warming reaction.

FIG. 6 is a longitudinal sectional view of still another form of the device after insertion of the food package and initiation of the warming operation.

FIG. 7 is a transverse fragmentary sectional view on the line 7–7 of FIG. 6.

Figure 2:
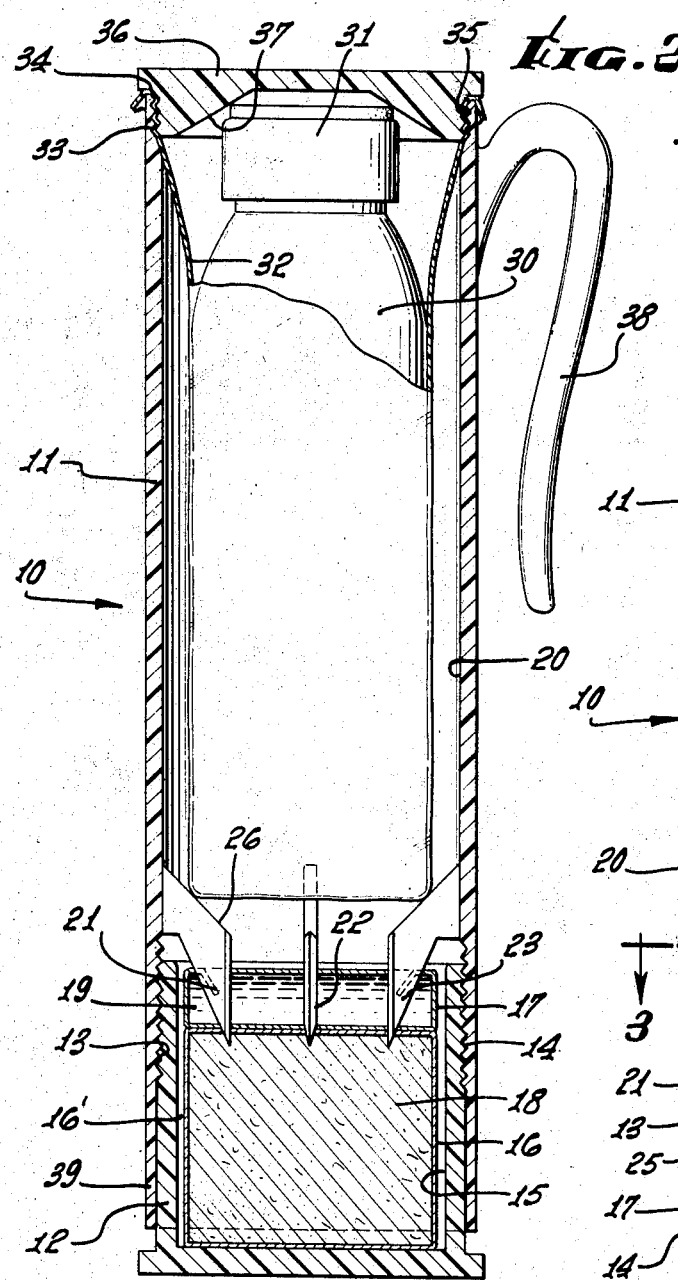
FIG. 2 is a longitudinal sectional view showing the condition of parts of the containing means after it has been closed and the warming reaction is progressing.

In an embodiment of the invention chosen for the purpose of illustration there is shown a food warmer consisting in the main of a multiple part container indicated generally by the reference character 10 consisting of an upper container member 11 and a lower container member 12, which have respective threaded connections 13 and 14 by means of which they may be threadedly attached together.

In the lower container member is a fuel chamber 15 in which is a relatively large sack 16 of fracturable film material and a relatively smaller sack 17 of comparable material. In the relatively larger sack 16 is a mass of dry powder or granular material 18 which may, for example, consist of quick lime or comparable material which remains inactive while dry, but which reacts in the presence of moisture to give an exothermic reaction.

Figure 1:
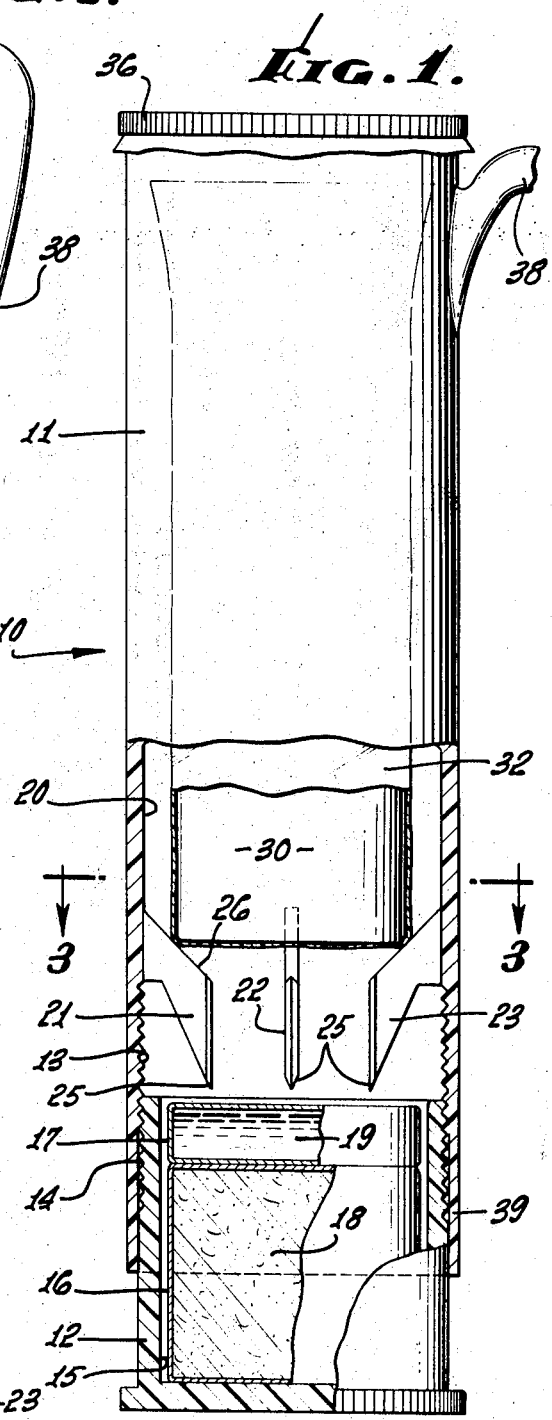
FIG. 1 is a side elevational view partially in section showing the condition of two parts of the containing means in initial position prior to initiating the warming operation.
Figure 3:
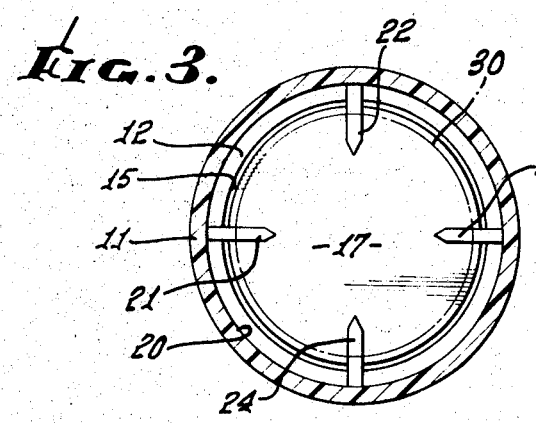
FIG. 3 is a cross-sectional view on the line 3–3 of FIG. 1.

The sack 17 contains a mass 19 of water sufficient in quantity to completely react the material 18 in the sack 16. The sacks 16 and 17 are packed together in compact relationship as shown in FIGS. 1 and 2 with, in the chosen example, the sack 17 containing water uppermost. Although this method of packing is suggested by way of example, it will be appreciated that the sack 17 containing water may, if preferred be packed within the upper end of the sack 16 or in fact located elsewhere, depending on the reach of some suitable perforating device.

In the upper container member 11 is a work chamber 20 at the lower end of which are piercing fingers 21, 22, 23, and 24 uniformly spaced about the interior of the chamber and having downwardly extending points 25. The points are so located that, as illustrated in FIG. 1, when the containers are partially threaded into engagement the points are clear of the chamber 15 and its contents, the fingers being long enough so that they extend entirely through the sack 17 and into the sack 16 when the container members are completely threaded together in the position shown in FIG. 2.

Upper edges of the piercing fingers provide shoulders 26 which, in the chosen embodiment, are sloping and which accommodate and center among them a food containing package 30. The package 30 may contain a liquid substance such as milk, coffee, chocolate, etc. or may if desired contain food elements of other consistency. A closure 31 on the top of the package is adapted to completely seal the contents.

Located between the exterior of the package 30 and the interior of the chamber 20 is a collapsible flexible bag 32 of some appropriate tough film material which is sealed around an upper circumference 33 to the upper edge 34 of the container member 11, the bag 32 thus serving to completely isolate the package 30 from the chamber 20. An open upper end 35 of the container member 11 has a threaded interior for engagement with a cap 36 by means of which the chamber 20 may be sealed at its upper end. In the present instance the cap 36 is provided with a recess 37 to snugly accommodate the closure 21. On the exterior of the upper container element is a hooklike appendage 38 which may on occasion serve as a handle or which in the alternative may provide a hanging means for supporting the container as a whole while the warming action is taking place in the event that the exterior of the container becomes too hot to be handled comfortably.

In operation, the package 30 is placed in the upper container element 11 and there sealed in place by application of the cap 36. A lower skirt 39 of the upper container element 11 is then passed over the exterior of the lower container element 12 until the threaded connections begin to engage. The parts are then threaded together which progressively advances the fingers 21, 22, 23, and 24 downwardly from the position shown in FIG. 1 to the position shown in FIG. 2. When the piercing fingers reach the position of FIG. 2, they have already penetrated the sack 17 of water and also have torn into the sack 16 containing the dry material. Water by this operation is admitted to the lower sack 16 whereby to initiate the expected exothermic reaction. A slight surplus of water may be supplied so as to be capable of being heated sufficiently hot to generate hot vapor or to some degree steam sufficient to be driven upwardly into the chamber 20 surrounding the bag 32 and entirely filling the space between the interior of the chamber 20 and the exterior of the package 30. The contents of the sacks are so adjusted that any steam pressure generated is kept sufficiently low so that there is no prospect of rupturing any portion of the container while at the same time being such that adequate heat will be generated sufficient to heat the package and its contents to a desired temperature.

A space 16' is provided between the wall of sacks 16 and 17 and the wall of the fuel chamber 15 so that the fingers can rotate the sacks while piercing them and avoid tearing and scattering the contents.

After heating has been completed, the cap 36 is removed and the package 30 extracted from the upper container member in a heated condition ready for use. After this the container members 11 and 12 can be disengaged and the sacks 16 and 17 and any contents remaining in them disposed.

In the embodiment of the invention shown in FIGS. 4 and 5, a somewhat simpler structure is made use of featuring an upper container element 40 and a lower container element 41. In this instance, there is a skirt or bell portion 42 having a lower flared edge 43 so sized that it provides a liquidtight fit over a spigot portion 44 of the lower container element 41. A sack 45 of dry powder or granular material 46 is located below a sack 47 of water 48. Piercing fingers 49 are of sufficient length to penetrate the sack 47 and also the upper portion of the sack 45 when the upper container member 40 is merely pushed into engagement with the lower container element 41, as the fingers 49 enter a fuel chamber 41'.

At the upper end of the upper container element 40 is a flanged edge 50 which overlies an opening 51 within which is located a flange 52 of a cap 53. When this device is made use of, a package 54 containing food is inserted in the bottom of the upper container member 40 before it is applied to the lower container member 41 after which the container members are pushed together to perform the piercing operation previously made reference to which results in generation of hot vapor or steam in a work chamber 55 surrounding the package 54 and remain in contact until the package 54 and its contents are heated.

In a third form of the invention shown in FIGS. 6 and 7 a container 60 provides a fuel chamber 61 and a work chamber 62, the work chamber 62 being separated from the fuel chamber 61 by a sack 63 of water 64 and a sack 65 of powder or granular material 66 of the type heretofore described. An upper open end 67 is closed by means of a lid 68 having a hinge attachment 69 to the container 60. A peripheral flange 70 is adapted to be pressed over the exterior of the container 60 in sealed relationship when the operation of heating is underway.

Prongs 71 are attached to the lid 68 adjacent the hinge attachment 69, the prongs being long enough, and also clearing the end of a package 72 for food so that the prongs 71 can be swung downwardly into a position fracturing the sacks 63 and 65 at the same time that the lid is closed and sealed in place, thereby to initiate the exothermic reaction which by emitting the hot vapor or steam as previously described heats up the work chamber 62 and the package 72 and its contents. When the heating operation is complete, the lid 68 is lifted, the package 72 removed, and the container and its used contents can then be disposed of.

Although no specific mention has been made of the material comprising the containers in the several forms of the invention, it will be understood that they can be one of the currently available commercial foam plastics made use of because of the inherent insulating characteristics, or fibrous or cellular cardboard, or virtually any relatively inexpensive material capable of preventing to a degree the passage of heat through itself, while at the same time being sufficiently strong to hold the package in place and to prevent rupture when the heating vapor is released.

I claim:

1. A food warmer for a food containing package, said warmer comprising a first container for heat generating elements, a second container for said package and a closure for said second container, said first container comprising a base and sidewall structure forming a fuel chamber having an open side, said heat generating elements comprising a first sealed sack of fracturable film material containing normally dry particles which have an exothermic reaction in the presence of moisture and a second sealed sack of fracturable film material containing water, said sacks being packed adjacent each other in said fuel chamber, said second container comprising a wall structure forming a work chamber having a first opening for reception of the package and a second opening in substantial alignment with the open side of the fuel chamber, complementary progressive engaging means respectively on said first and second containers and piercing means on said second container of length sufficient to progress from a position clear of said sacks when said engaging means is in an initial stage of engagement to a position wherein both said sacks are pierced whereby to enable generation and confinement of hot vapor in the work chamber when the work chamber is closed.

2. A food warmer as in claim 1 wherein there is a flexible bag in said work chamber forming a separator between the wall of the work chamber and said food containing package.

3. A food warmer as in claim 1 wherein there is an exterior supporting means on said second container for holding said second container during the warming cycle.

4. A food warmer as in claim 1 wherein said progressive engaging means is a threaded connection.

5. A food warmer as in claim 1 wherein said progressive engaging means is a sliding bell and spigot joint.

6. A food warmer as in claim 1 wherein said piercing means comprises at least one prong having a point on a free end located within said second opening and a shoulder on said piercing means at a location adapted to support said food containing package.

7. A food warmer as in claim 6 wherein said shoulder is of variable scope adapted to support food containing packages of variable length and diameter.

8. A food warmer for a food containing package, said warmer comprising container means having a fuel chamber for heat generating elements and a work chamber for said package, a first sealed sack of fracturable film material containing normally dry particles which have an exothermic reaction in the presence of moisture and a second sealed sack of fracturable film material containing water, said sacks being packed adjacent each other in said fuel chamber, a lid hinged to said container means, said lid having a closed position sealing said work chamber, and a piercing prong on said lid at a location removed from engagement with said sacks and having a location in piercing engagement with both said sacks when said lid is in closed position.